United States Patent
Kim et al.

(10) Patent No.: US 10,383,118 B2
(45) Date of Patent: Aug. 13, 2019

(54) METHOD FOR TRANSMITTING SIGNAL FOR V2X COMMUNICATION IN WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Hanbyul Seo, Seoul (KR); Seungmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/750,373

(22) PCT Filed: Aug. 8, 2016

(86) PCT No.: PCT/KR2016/008700
§ 371 (c)(1),
(2) Date: Feb. 5, 2018

(87) PCT Pub. No.: WO2017/023150
PCT Pub. Date: Feb. 9, 2017

(65) Prior Publication Data
US 2018/0234967 A1    Aug. 16, 2018

Related U.S. Application Data

(60) Provisional application No. 62/202,159, filed on Aug. 6, 2015, provisional application No. 62/206,820, filed on Aug. 18, 2015.

(51) Int. Cl.
*H04W 72/04* (2009.01)
*H04W 4/44* (2018.01)
(Continued)

(52) U.S. Cl.
CPC ....... *H04W 72/0446* (2013.01); *H04L 5/0044* (2013.01); *H04L 27/2602* (2013.01); *H04W 4/40* (2018.02); *H04W 4/44* (2018.02)

(58) Field of Classification Search
None
See application file for complete search history.

(56) References Cited

U.S. PATENT DOCUMENTS

2012/0087292 A1* 4/2012 Grimm ................ H04W 72/02
370/312
2013/0279491 A1  10/2013 Rubin et al.
(Continued)

FOREIGN PATENT DOCUMENTS

WO    2015021185 A1    2/2015

OTHER PUBLICATIONS

Intel Corporation; "Discussion on Time Resource Pattern of Transmission," 3GPP TSG RAN WG1 Meeting #80, Feb. 9-13, 2015, R1-150235.
(Continued)

*Primary Examiner* — Rebecca E Song
(74) *Attorney, Agent, or Firm* — Dentons US LLP

(57) ABSTRACT

The present invention relates to a method and an apparatus for receiving a user equipment signal for vehicle to everything (V2X) communication in a wireless communication system. Particularly, the method comprises the steps of: receiving a V2X signal in a time domain; and acquiring, from the V2X signal, V2X data in resource elements, which correspond to a plurality of sub-carriers determined according to a specific pattern among the sub-carriers configured for the user equipment and have a specific symbol index, wherein the V2X data is allocated so as to be separated, on the plurality of sub-carriers, as far as an interval determined according to the specific pattern in a frequency domain, and
(Continued)

the V2X signals are characterized in that V2X data signals are repeated and represented the number of times corresponding to the specific pattern at a time interval corresponding to one symbol in the time domain.

11 Claims, 13 Drawing Sheets

(51) Int. Cl.
    *H04L 5/00*         (2006.01)
    *H04L 27/26*       (2006.01)
    *H04W 4/40*       (2018.01)

(56) References Cited

U.S. PATENT DOCUMENTS

2018/0115960 A1* 4/2018 Sorrentino .......... H04W 72/042
2018/0131468 A1* 5/2018 Blasco Serrano .... H04L 1/0025

OTHER PUBLICATIONS

LG Electronics Inc.; "V2V/V2I communication," 3GPP TSG-SA WG1 Meeting #70, Apr. 13-17, 2015, S1-151103.

* cited by examiner

FIG. 2
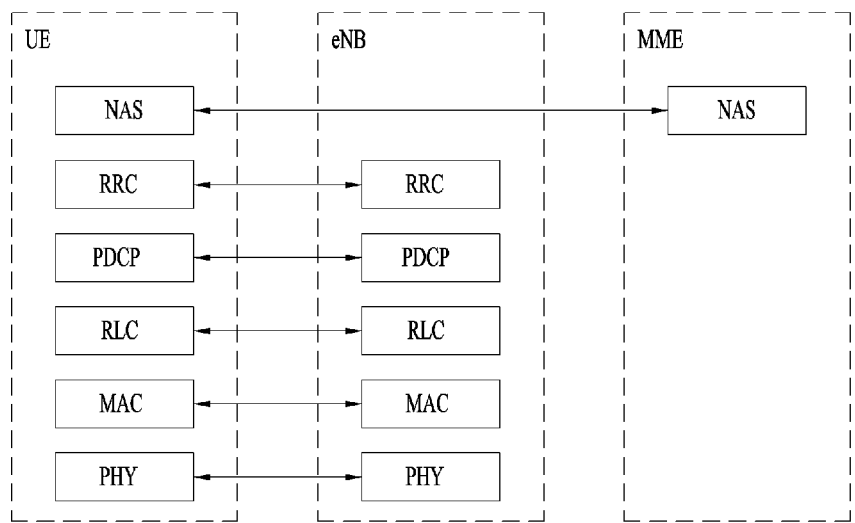
(a) control-plane protocol stack
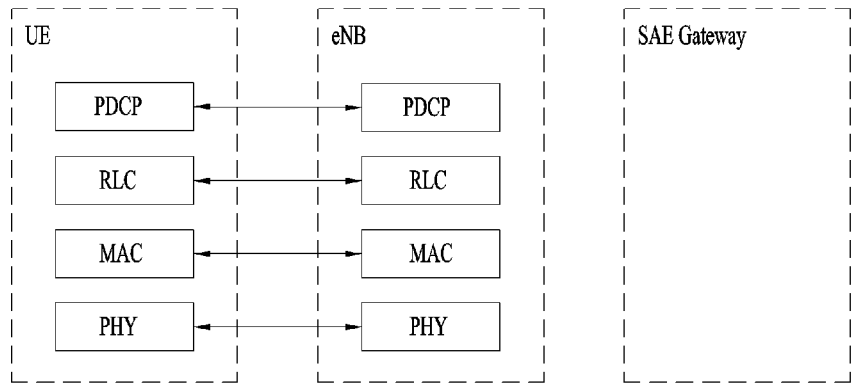
(b) user-plane protocol stack FIG. 8
(a) 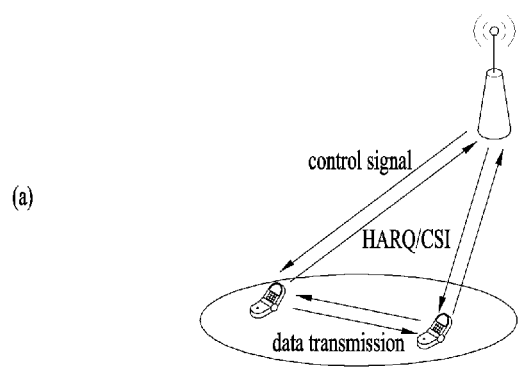
(b) 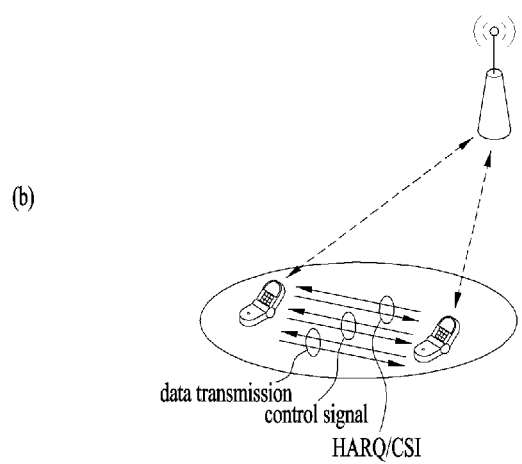

(a)                    (b)

FIG. 11
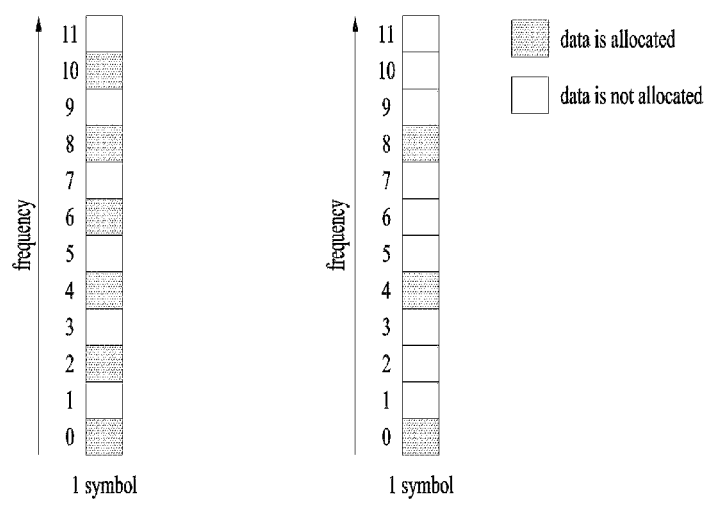
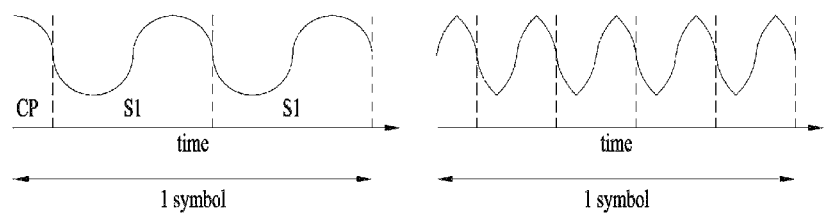
(c)                 (d)

METHOD FOR TRANSMITTING SIGNAL FOR V2X COMMUNICATION IN WIRELESS COMMUNICATION SYSTEM AND APPARATUS THEREFOR

This application is a 35 USC § 371 National Stage entry of International Application No. PCT/KR2016/008700 filed on Aug. 8, 2016, and claims priority to U.S. Provisional Application No. 62/202,159 filed on Aug. 6, 2015, and U.S. Provisional Application No. 62/206,820 filed on Aug. 18, 2015, all of which are hereby incorporated by reference in their entireties as if fully set forth herein.

TECHNICAL FIELD

The present invention relates to a wireless communication system, and more particularly, to a method of transmitting a signal for V2X communication in a wireless communication system and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE OF THE INVENTION

Technical Problem

Based on the aforementioned discussion, a method of transmitting a signal for V2X communication in a wireless communication system and an apparatus therefor are proposed in the following.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a signal, which is received by a user equipment for V2X (vehicle to everything) communication in a wireless communication system, includes the steps of receiving a V2X signal in a time domain, and acquiring, from the V2X signal, V2X data in resource elements, which correspond to a plurality of subcarriers determined according to a specific pattern among subcarriers configured for the user equipment and have a specific symbol index. In this case, the V2X data is allocated in a manner of being separated on a plurality of the subcarriers as much as an interval determined according to the specific pattern in a frequency domain and the V2X signal is characterized in that a V2X data signal is repeated as many as a count corresponding to the specific pattern at a time interval corresponding to one symbol in the time domain.

Preferably, the V2X signal is configured in a manner that a cyclic prefix precedes at the time interval and the V2X data signal appears after the cyclic prefix.

More preferably, the V2X data can be obtained from a first V2X data signal appearing after the cyclic prefix. Preferably, the V2X data can be obtained by performing FFT (Fast Fourier Transform) on a V2X data signal which is restored by repeating the first V2X data signal appearing after the cyclic prefix. A time interval between the first V2X data signal and the last of the time interval can be configured to be used as a Tx/Rx switching section. Moreover, a value corresponding to the Tx/Rx switching section can be received via a control channel. The V2X signal can include a first section for performing AGC (automatic gain control) and a second section for receiving data. In this case, the V2X data can be obtained from a V2X data signal corresponding to the second section. The time interval may correspond to a subframe, the V2X signal includes a first section for performing AGC (automatic gain control) and Tx/Rx switching and a second section for receiving data in the subframe, and the V2X data can be obtained from a V2X data signal corresponding to the second section.

Moreover, the time interval can be indicated via on-off masking.

To further achieve these and other advantages and in accordance with the purpose of the present invention, according to a different embodiment, a method of transmitting a signal, which is transmitted by a user equipment for V2X (vehicle to everything) communication in a wireless communication system, includes the steps of allocating V2X data to resource elements, which correspond to a plurality of subcarriers determined according to a specific pattern among subcarriers configured for the user equipment and have a specific symbol index, and transmitting a V2X signal in a time domain based on the resource elements to which the V2X data is allocated. In this case, the V2X data is allocated in a manner of being separated on a plurality of the subcarriers as much as an interval determined according to the specific pattern in a frequency domain and the V2X signal is characterized in that a V2X data signal is repeated as many as a count corresponding to the specific pattern at a time interval corresponding to one symbol in the time domain.

To further achieve these and other advantages and in accordance with the purpose of the present invention, according to a further different embodiment, a user equipment receiving a signal for V2X (vehicle to everything) communication in a wireless communication system includes a radio frequency unit and a processor, the processor configured to receive a V2X signal in a time domain, the processor configured to acquire, from the V2X signal, V2X data in resource elements, which correspond to a plurality of subcarriers determined according to a specific pattern among subcarriers configured for the user equipment and have a specific symbol index. In this case, the V2X data is allocated in a manner of being separated on a plurality of the subcarriers as much as an interval determined according to the specific pattern in a frequency domain and the V2X signal is characterized in that a V2X data signal is repeated as many as a count corresponding to the specific pattern at a time interval corresponding to one symbol in the time domain.

Advantageous Effects

According to the present invention, it is able to efficiently transmit a signal for V2X communication in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

FIG. 2 is a diagram illustrating structures of a control plane and a user plane of a radio interface protocol between a user equipment and E-UTRAN based on the 3GPP radio access network standard;

FIG. 8 is a diagram for explaining D2D (UE-to-UE communication) communication;

FIG. 11 is a diagram for explaining a signal/data of a comb form appearing in time domain according to the present invention;

BEST MODE

Mode for Invention

Figure 1:
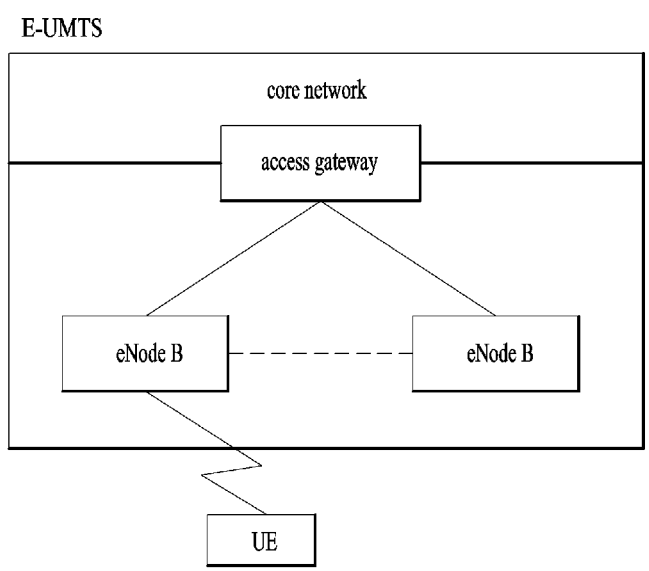
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
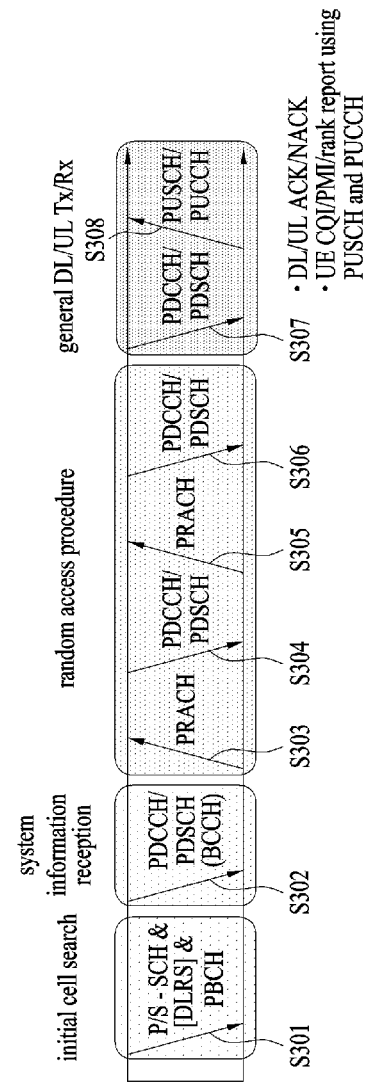
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
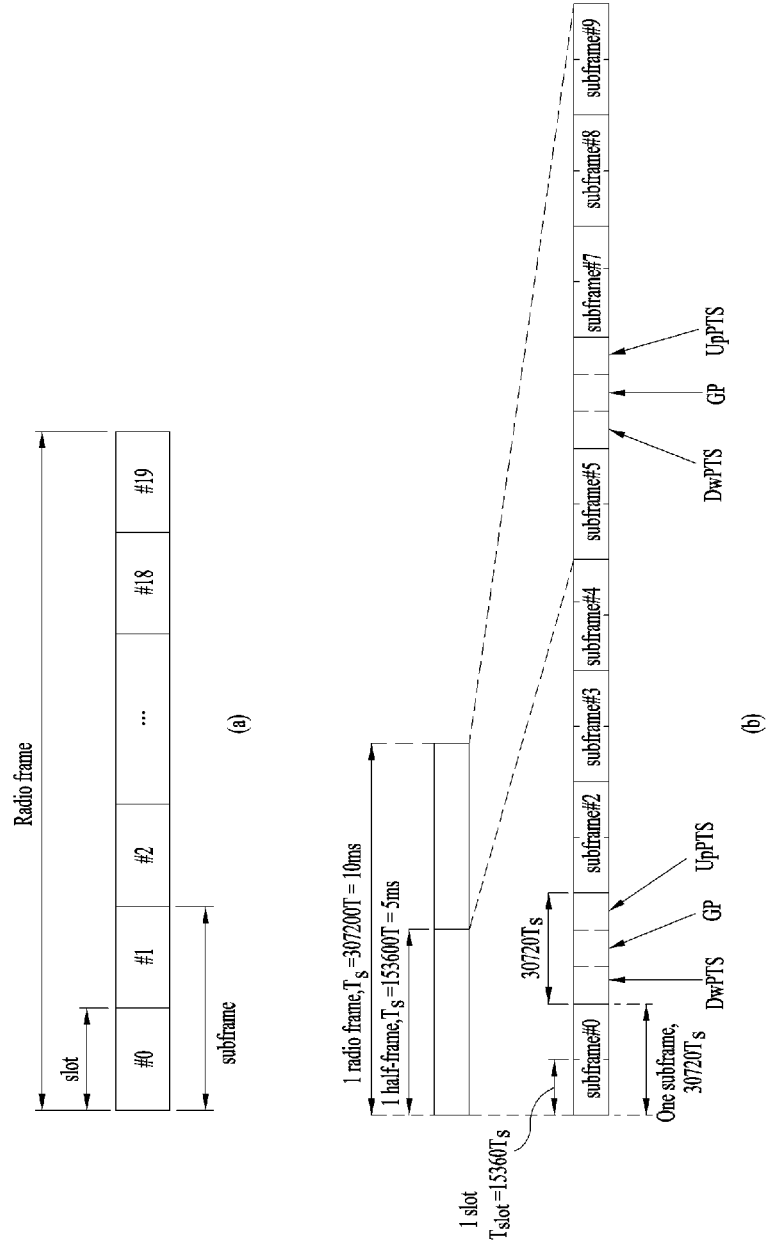
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
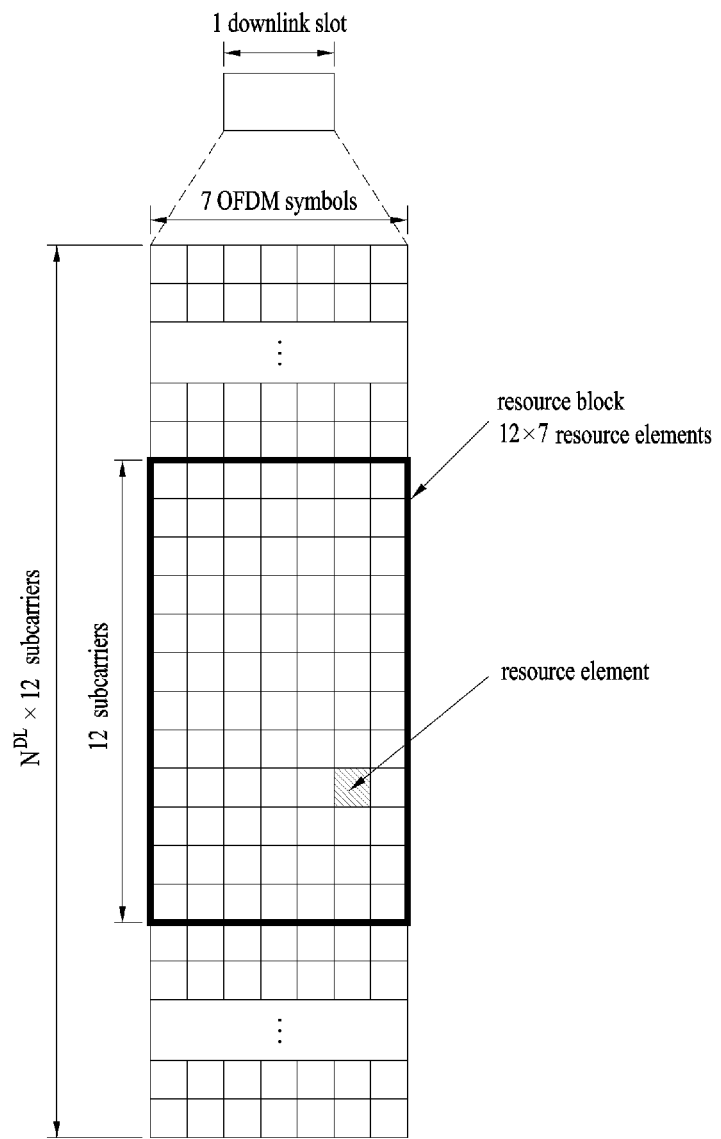
FIG. 5 is a diagram of a resource grid for a downlink slot.

FIG. 5 is a diagram for an example of a resource grid for a downlink slot.

Referring to FIG. 5, a downlink slot includes $N_{symb}^{DL}$ OFDM symbols in time domain and resource blocks in frequency domain. Since each resource block includes $N_{RB}^{DL}$ subcarriers, a downlink slot includes $N_{RB}^{DL} \times N_{sc}^{RB}$ subcarriers in frequency domain. FIG. 5 shows an example that a downlink slot includes 7 OFDM symbols and a resource block includes 12 subcarriers, by which the present invention may be non-limited. For example, the number of OFDM symbols included in a downlink slot may vary according to a length of a cyclic prefix (CP)

Each element on a resource grid is called a resource element (hereinafter abbreviated RE) and one resource element is indicated by a single OFDM symbol index and a single subcarrier index. One RB consists of $N_{symb}^{DL} \times N_{sc}^{RB}$ resource elements. The number ($N_{RB}^{DL}$) of resource blocks included in a downlink slot is dependent on a downlink transmission bandwidth configured in a cell.

Figure 6:
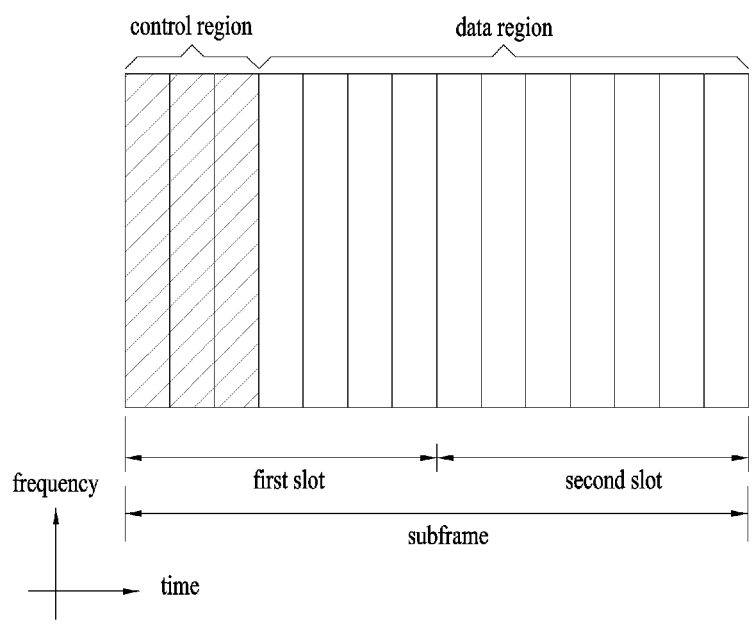
FIG. 6 is a diagram for an example of a structure of a downlink subframe.

FIG. 6 is a diagram for an example of a structure of a downlink subframe.

Referring to FIG. 6, maximum 3 (4) OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by LTE may include PCFICH (Physical Control Format Indicator Channel), PDCCH (Physical Downlink Control Channel), PHICH (Physical hybrid ARQ indicator Channel) and the like. The PCFICH carried on a first OFDM symbol of a subframe carries the information on the number of OFDM symbols used for the transmission of control channels within the subframe. The PHICH carries HARQ ACK/NACK (hybrid automatic repeat request acknowledgement/negative acknowledgement) signal in response to an UL transmission.

Control information carried on PDCCH may be called downlink control information (DCI). The DCI includes resource allocation information for a user equipment or a user equipment group and different control information. For example, the DCI includes DL/UL scheduling information, UL transmit (Tx) power control command and the like.

PDCCH is able to carry a transmission format and resource allocation information of DL-SCH (downlink shared channel), a transmission format and resource allocation information of UL-SCH (uplink shared channel), paging information on PCH (paging channel), system information on DL-SCH, resource allocation information of an upper layer control message such as a random access response transmitted on PDSCH, a transmit power control command set for individual user equipments within a user equipment (UE) group, a transmit power control command, activation indication information of VoIP (voice over IP) and the like. A plurality of PDCCHs can be transmitted in a control region and a user equipment is able to monitor a plurality of the PDCCHs. PDCCH is transmitted on an aggregation of a plurality of contiguous control channel elements (CCEs). A CCE is a logical assignment unit used to provide PDCCH with a code rate in accordance with a state of a radio channel A CCE corresponds to a plurality of REGs (resource element groups). A format of PDCCH and the number of bits of PDCCH are determined by the number of the CCEs. A base station determines a PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or usage of PDCCH. If the PDCCH is provided for a specific user equipment, the CRC can be masked with an identifier of the corresponding user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). If the PDCCH is provided for a random access response, the CRC can be masked with RA-RNTI (random access-RNTI).

Figure 7:
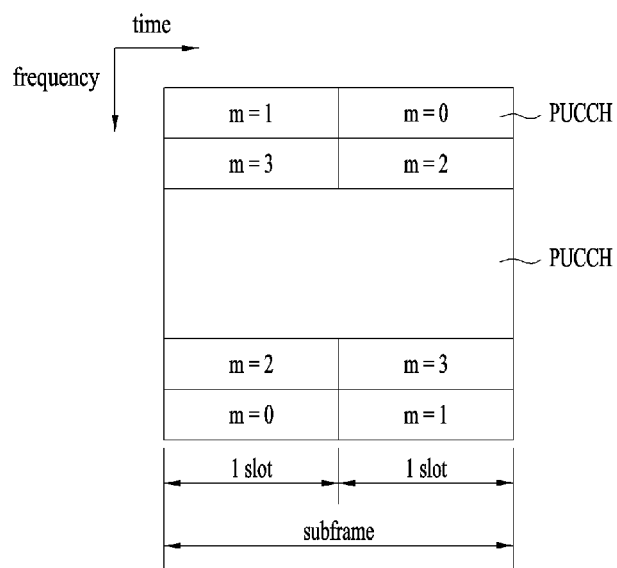
FIG. 7 is a diagram for an example of a structure of an uplink subframe in LTE.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH In the following description, a D2D (UE-to-UE communication) communication is explained.

A D2D communication scheme is mainly divided into a scheme of receiving help from a network/coordination station (e.g., a base station) and a scheme not receiving help from the network/coordination station.

Referring to FIG. 8, FIG. 8(a) shows a scheme that the network/coordination station involves in transmitting and receiving a control signal (e.g., a grant message), HARQ, channel state information, and the like and data is transmitted and received only between UEs performing D2D communication. FIG. 8(b) shows a scheme that the network provides minimum information (e.g., D2D connection information capable of being used in a corresponding cell, etc.) to UEs and the UEs performing D2D communication form a link and perform data transmission and reception.

Figure 9:
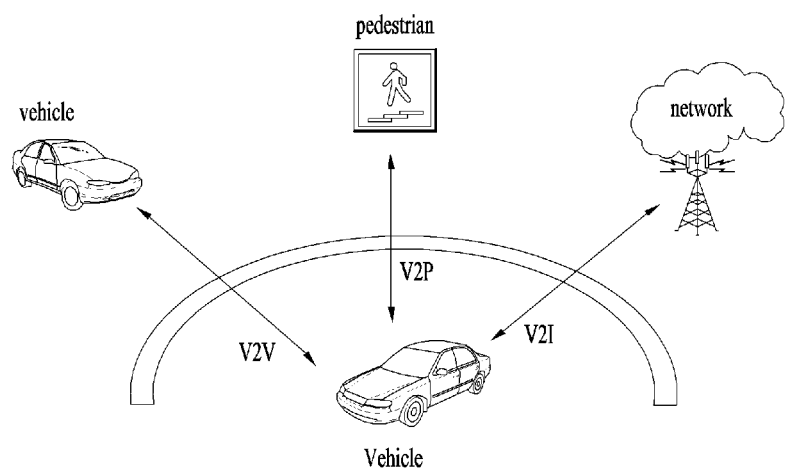
FIG. 9 is a diagram for explaining a V2X scenario.

FIG. 9 is a diagram illustrating V2X (vehicle to everything) communication environment.

If a car accident occurs, damage of human life and damage of property occur. Hence, when a vehicle operates, a technology capable of securing not only the safety of a person on the vehicle but also the safety of a pedestrian is increasingly required. As a result, a hardware and software based technology specialized to a vehicle is now incorporated into a vehicle.

An LTE-based V2X (vehicle-to-everything) communication technology started from 3GPP also reflects the tendency that an IT (information technology) is incorporated into a vehicle. A connectivity function is mainly applied to a certain type of vehicle and ongoing effort to support V2V (vehicle-to-vehicle) communication, V2I (vehicle-to-infrastructure) communication, V2P (vehicle-to-pedestrian) communication, and V2N (vehicle-to-network) is in progress via the evolution of the connectivity function.

According to the V2X communication, a vehicle consistently broadcasts information on a location, a speed, a direction, and the like of the vehicle. Having received the broadcasted information, an adjacent vehicle recognizes movement of vehicles near the adjacent vehicle and utilizes the movements to prevent an accident.

Similar to a case that a person possesses a terminal having a shape of a smartphone or a smart watch, a terminal (or, a UE (user equipment)) of a specific shape is installed in each vehicle. In this case, the UE installed in a vehicle corresponds to a device receiving an actual communication service from a network. For example, the UE installed in the vehicle can receive a communication service in a manner of accessing an eNB in E-UTRAN.

Yet, in order to implement V2X communication in a vehicle, it is necessary to consider various items. This is because an astronomical amount of money is required to install a traffic safety infrastructure such as a V2X eNB, and the like. In particular, in order to support the V2X communication to all of the roads on which a vehicle is movable, it is necessary to install hundreds of thousands of V2X eNBs. Moreover, since each network node basically uses a wired network to stably perform communication with a server and accesses the internet or a central control server using the wired network, installation/maintenance cost for the wired network is also high.

In the following, the present invention explains a physical format in consideration of Tx/Rx (or, Rx/Tx) switching time and AGC (automatic gain control) based on the aforementioned contents. In the following, for clarity, the present invention is described centering on a V2X scenario. Yet, the present invention can also be applied to a different scenario such as D2D and the like.

According to the V2X scenario, i) Tx/Rx UEs perform a reception operation immediately after a signal is transmitted or ii) the Tx/Rx UEs may perform a transmission operation immediately after a signal is received. In this case, in order to perform a Tx/Rx switching operation at Tx/Rx switching timing, it is necessary to have certain time. This is because, in order to perform filtering in a frequency band, it is necessary to have time as much as a pulse length for the filtering in a time axis.

For example, in case of 5.9 GHz corresponding to an unlicensed band currently discussed for V2X, if filtering is performed on a frequency band in 5.9 GHz, it may cut the frequency band loosely.

Figure 10:
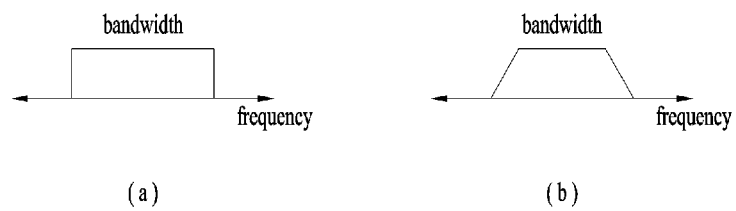
FIG. 10 is a diagram for explaining filtering of a frequency band.

FIG. 10 is a diagram for explaining filtering of a frequency band. If it is assumed that FIG. 10(a) corresponds to a tight filter, it may assume that FIG. 10(b) corresponds to a loose filter.

In this case, for the filter shown in FIG. 10(a), since a sync function is performed in a time axis, infinite time is required in the time axis. Hence, it may attempt to make a filter similar to the filter shown in FIG. 10(a) as much as possible by cutting the filter at appropriate time. On the contrary, in case of the filter shown in FIG. 10(b), both ends of the filter are cut through a sync function in a time axis using less time compared to the filter shown in FIG. 10(a). In particular, the filter shown in FIG. 10(a) requires less time compared to the filter shown in FIG. 10(a).

Hence, if V2X communication is performed on 5.9 GHz corresponding to an unlicensed band, it may be required to have less time for performing filtering compared to LTE D2D. Currently, according to LTE D2D, the LTE D2D is configured in a form that one OFDM symbol is emptied out for Rx/Tx switching time.

The present invention proposes a method of emptying out a part of one symbol only instead of emptying out the whole of the one symbol in consideration of Rx/Tx switching time to be shortened and using the remaining part for data communication.

In this case, in general, one symbol is divided into two partial symbols, one partial symbol is used for data, and another partial symbol can be used for Rx/Tx switching. In this case, since an FFT size of the partial symbol is different from an FFT size of the remaining symbol, it is difficult to perform implementation.

In order to prevent this, it may apply a data of a comb form to a symbol index similar to a case that only a part of a symbol transmits a data. When data is transmitted in a form of N combs, it means that resources for transmitting data are allocated to subcarriers having a prescribed interval and data transmission is not performed on the remaining subcarriers. (In this case, the N is a natural number). In this case, signals/data transmitted in a form of N combs may have a form that the same signal is repeated N times in time domain. Information (e.g., subcarrier, symbol index, etc.) for configuring the signals/data in the form of N combs can be configured in advance, can be indicated by a base station, or can be indicated using higher layer signaling.

FIG. 11 is a diagram for explaining a signal/data of a comb form appearing in time domain. In FIG. 11, FIG. 11(a) shows a form of two combs and FIG. 11(b) shows a form of 4 combs. In this case, in case of a time domain signal of 2 combs shown in FIG. 11(a), as shown in FIG. 11(c), a cyclic prefix appears, an S1 signal appears, and the same S1 signal appears again. In case of a time domain signal of 4 combs shown in FIG. 11(d), a cyclic prefix appears and an S2 signal repeatedly appears 4 times. In this case, time for which a part of the repeated signal is transmitted is used as Rx/Tx switching time and data can be restored using a signal transmitted during the remaining time. For example, referring to FIG. 11(c), a CP and a firstly appearing S1 are used for restoring data and time for which a secondly appearing S1 is transmitted can be used as time for Rx/Tx switching. In this case, since a signal of a length corresponding to about a half of a length of a different symbol is used, a process of performing FFT after sampling used by the different symbol can be differently performed. Yet, in the aspect of implementation, if a firstly received S1 is concatenated to a secondly repeated S1 position, it may be able to identically use the process of performing FFT used by the different symbol.

Figure 12:
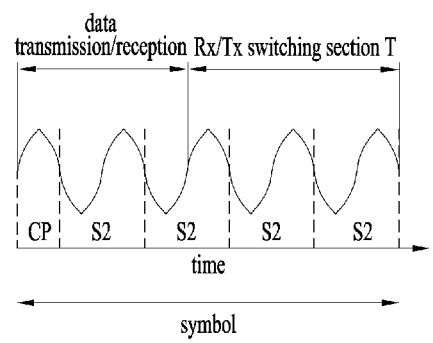
FIGS. 12 and 13 are diagrams for explaining a cyclic prefix and a time domain signal according to one embodiment of the present invention.

The present invention proposes that a transmission UE uses a form of N combs in a symbol to which Rx/Tx switching time is to be applied, time for which a part of signals of maximum N−1 times is transmitted is used as Rx/Tx switching time among a time domain signal repeated N times in signals/data of a form of N combs, and the remaining received signals are used for decoding data. The abovementioned operation can be performed in the last symbol of a subframe. In this case, it may consider two cases described in the following. Regarding this, it is explained with reference to FIG. 12.

1) when a transmission UE receives data in a subframe immediately after a subframe in which data is transmitted:

Since the transmission UE receives data in a next subframe, it is necessary for the transmission UE to perform a switching operation switched from Tx to Rx. The transmission UE can use time for which a part of signals repeated N−1 times is transmitted as Tx/Rx switching time among signals repeated N times while using N combs. (a part of signals repeated N−2 times, N−3 times, . . . is available as well.) If it is assumed that the time corresponds to T, in case of using 4 combs, it can be represented as FIG. 12. During the T, Rx/Tx switching time is applied. The transmission UE transmits signals until the T appears. A reception UE can receive signals until the T appears.

In case of a reception UE, since the reception UE is unable to receive signals during the T, a part corresponding to not received signals among received signals can be attached to the back. By doing so, it may be able to decode the entire signals and apply FFT identical to FFT of a different symbol.

2) when a transmission UE does not receive data or transmit data in a subframe immediately after a subframe in which data is transmitted:

Since the transmission UE does not receive data or transmits data in a next subframe, it is not necessary for the transmission UE to perform a switching operation switched from Tx to Rx. The transmission UE transmits all signals repeated N times while using N combs. If it is assumed that Rx/Tx switching time corresponds to T, in case of using 4 combs, it can be represented as FIG. 12. The transmission UE transmits all signals for a symbol including the T and a reception UE performing transmission in a next subframe applies Rx/Tx switching time during the T and receives signals in a different time period until the T appears. If the reception UE does not perform transmission in a next subframe, the Rx/Tx switching time T is not necessary. In particular, if it is determined that the transmission UE performs transmission in a part corresponding to the T, the reception UE can receive the part corresponding to the T as well.

If the reception UE fails to receive signals during the T, a part corresponding to not received signals among received signals can be attached to the back. By doing so, it may be able to restore the entire signals and apply FFT identical to FFT of a different symbol.

Since it is difficult for the reception UE to determine information on whether or not the transmission UE transmits a signal during the T, a control channel may inform the reception UE of the information via signaling. Or, similar to the situation of 1), in the situation of 2), it may not transmit a signal during the T and the reception UE can be configured not to receive a signal corresponding to the part.

In case of the 1) and the 2), a value for the T can be fixed to a Tx/Rx value in advance. Or, the transmission UE may inform the reception UE of the value via a control channel. A subframe except a symbol in which the T is included is defined as on-off masking in a time axis and time domain to be received by the reception UE can be defined as well.

In case of the 1) and the 2), a CP can be attached to the back of a symbol. In this case, it is necessary to have at least one repeated signal in a time period for which transmission or reception is to be performed except the T. And, it is necessary to additionally have a signal of a length longer than a length of a CP in the time period.

Figure 13:
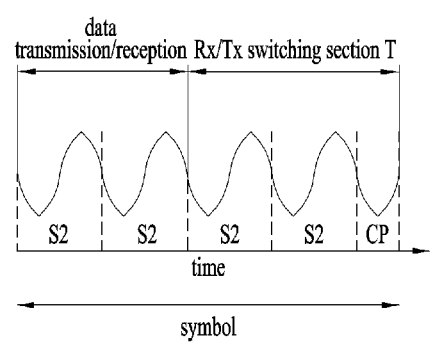

FIG. 13 is a diagram for explaining a case that a signal of a length longer than a CP length additionally exists. Referring to FIG. 13, it is able to see that a signal S2, which is repeated in a time period except the T, exists and a signal longer than a CP additionally exists for transmission and reception.

Moreover, in case of the 1) and the 2), it may be able to secure Rx/Tx switching time by adjusting a CP length. For example, in relation to an uplink resource in LTE system, a first symbol of two slots in a subframe has a CP length longer than a CP length of other symbols. In this case, a CP length of a first symbol of one or two slots is reduced to match the CP length with CP lengths of other symbols and the remaining length is attached to the last symbol of the subframe to make a length of the last symbol to be longer. By doing so, it may be able to more secure Rx/Tx switching time.

In the following, the present invention is explained in the aspect of AGC (automatic gain control). When filtering is performed with a power level of a signal received by a reception UE, the AGC is necessary to match the power level with a linear section. To this end, it may be necessary to have prescribed time (hereinafter, AGC time) in a first symbol of a subframe.

In the following, assume that a transmission UE uses signals of a form of N combs in a symbol to which an AGC time is to be applied. Time for which a part of the signals repeated maximum N−1 times (a part of the signals repeated N−2, N−3, . . . times is also available) among signals repeated N times is transmitted is used for AGC and the remaining signals can be used for decoding data. This operation can be performed in a first symbol of a subframe. The operation can be applied as 3) described in the following.

3) a transmission UE transmits all signals repeated N times while using signals/data of a form of N combs. When an AGC time corresponds to Ta, if 4 combs are used, it can be represented as FIG. E. The transmission UE transmits all signals for a single symbol including the time Ta and a reception UE applies the AGC time during the time Ta and receives signals in a time section appearing after the AGC time. If the reception UE receives data from the same transmission UE in a previous subframe, since the AGC time Ta is not necessary, the reception UE can receive a part corresponding to the time Ta together.

If the reception UE fails to receive a signal during the time Ta, among received signals, a part corresponding to a not received signal is detached and the part is attached to the front to decode the entire signals. And, it may be then able to apply FFT similar to FFT of other symbols.

Figure 14:
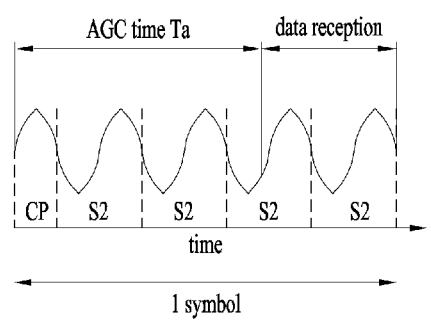
FIGS. 14 and 15 are diagrams for explaining an AGC time and a time domain signal according to one embodiment of the present invention.

In this case, it is necessary to have at least one repeated signal in a time section except the time Ta and it is necessary to have an additional signal of a length equal to or longer than a CP length. Referring to FIG. 14, a signal S2 repeated in a time section except the time Ta exists and a signal longer than a CP length additionally exists.

In case of the 3), a value for the time Ta can be fixed to a Tx/Rx value in advance. Or, the transmission UE may inform the reception UE of the value via a control channel A subframe except the time Ta is defined as on-off masking in a time axis and time domain to be received by the reception UE can be defined as well.

Figure 15:
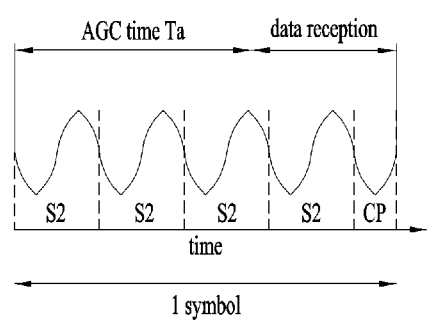

In case of the 3), it may configure a CP to be attached to the back of a symbol. FIG. 15 shows the case.

In case of the 3), it may secure AGC switching time by adjusting a CP length. In relation to an uplink resource in LTE system, a first symbol of two slots in a subframe has a CP length longer than a CP length of other symbols. In this case, a CP length of a first symbol of a second slot is reduced to match the CP length with CP lengths of other symbols and the remaining length is attached to the first symbol to make a length of the first symbol to be longer. By doing so, it may be able to more secure the AGC switching time.

Figure 16:
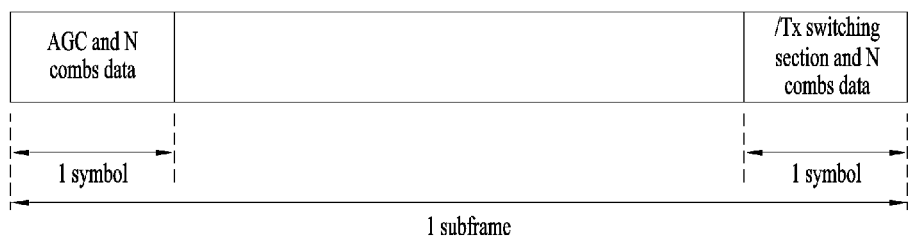
FIG. 16 is a diagram illustrating a configuration for a first symbol for AGC and the last symbol for Rx/Tx switching in a subframe.

Moreover, FIG. 16 shows a case that the AGC is designed for the first symbol and the Rx/Tx switching is designed for the last symbol.

In the following, a method of configuring the first symbol and the last symbol of a subframe is explained in consideration of the AGC and the Rx/Tx switching time together. It is not mandatory that the Rx/Tx switching is performed in the last symbol of a subframe. In particular, it may consider configuring AGC time while setting the Rx/Tx switching time to the first symbol at the same time. Cases of 4) and 5) are explained in the following.

4) when a transmission UE receives data in a subframe immediately before a subframe in which data is transmitted:

Since the transmission UE receives data in a previous subframe, it is necessary for the transmission UE to perform a switching operation switched from Rx to Tx. The operation can be performed in a first symbol of a subframe. A reception UE performs AGC as well in the first symbol. To this end, the transmission UE uses time for which a part of signals repeated N−1 times (a part of signals repeated N−2 times, N−3 times, . . . is available as well.) among signals repeated N times is transmitted as Tx/Rx switching time and AGC while using signals/data of a form of N combs. In this case, a UE, which is switched to Rx from Tx in a previous subframe, should perform not only the Rx/Tx switching but also the AGC. In this case, time for performing the Rx/Tx switching and the AGC may be insufficient in a first symbol. Hence, the transmission UE reduces a size of the last symbol by getting rid of time for which a part of signals repeated M−1 times among signals repeated M times is transmitted from the last symbol while using signals/data of a form of M combs. In particular, the transmission UE may use time as much as the reduced symbol size in a manner of attaching the time to the first symbol.

Figure 17:
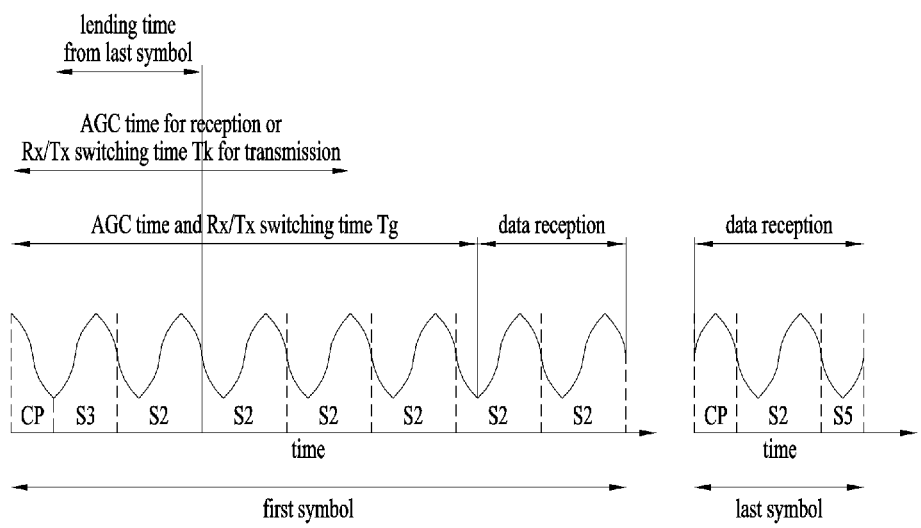
FIGS. 17 and 18 are diagrams for explaining a method of adjusting a symbol size for Rx/Tx switching and AGC.

A method of adjusting a symbol size for Rx/Tx switching and AGC is explained with reference to FIG. 17 in the following. Assume that time used for the Rx/Tx switching and the AGC corresponds to Tg. In case of using signals/data of a form of 4 combs, the first symbol and the last symbol can be represented as FIG. 17.

In the first symbol, the time Tg is applied for the Rx/Tx switching time and the AGC, a transmission UE transmits a signal after the time Tg appears, and a reception UE receives a signal after the time Tg appears. In this case, the first symbol is used in a manner that partial time of the last symbol is attached to the first symbol. In FIG. 17, time as much as one S3 and two S2 is detached from the last symbol and a symbol length of the last symbol is reduced as much as the detached time. The time detached from the last symbol may correspond to time as much as a part of signals repeated M−1 times (a part of signals repeated M−2, M−3, . . . times is also available) among signals repeated M times.

Meanwhile, the transmission UE does not need the AGC time and a UE, which used to perform Rx in a previous frame, does not need the Rx/Tx switching time. Hence, time shorter than the Tg can be separately defined and managed as Tk in consideration of the Rx/Tx switching time for the transmission UE and the AGC time for the UE. In this case, the transmission UE transmits data after the Tk elapses and the UE receives data after the Tk elapses. Since a reception UE, which used to perform Tx in a previous subframe, needs both the Rx/Tx switching time and the AGC time, the reception UE receives data after the Tg elapses.

Since the reception UE fails to receive signals during the time Tg or Tk in the first symbol and fails to receive signals as much as time detached for the first symbol in the last symbol, a part corresponding to not received signals among received signals can be attached. By doing so, it may be able to decode the entire signals and apply FFT identical to FFT of a different symbol.

5) when a transmission UE does not receive data or transmit data in a subframe immediately before a subframe in which data is transmitted:

Since the transmission UE does not receive data or transmits data in a previous subframe, it is not necessary for the transmission UE to perform a switching operation switched from Tx to Rx. However, a reception UE may need to have time for AGC. In this case, a UE, which is switched to Rx from Tx in a previous subframe, should perform not only the Rx/Tx switching but also the AGC. In this case, time for performing the Rx/Tx switching and the AGC may be insufficient in a first symbol. Hence, the transmission UE reduces a size of the last symbol by getting rid of time for which a part of signals repeated M−1 times (a part of signals repeated M−2, M−3, . . . times is also available) among signals repeated M times is transmitted from the last symbol while using signals/data of a form of M combs. The transmission UE may use the first symbol by attaching the reduced time to the first symbol.

Assume that time used for the Rx/Tx switching and the AGC corresponds to Tg. In case of using signals/data of a form of 4 combs, the first symbol and the last symbol can be represented as FIG. 17. In the first symbol, the time Tg is applied for the Rx/Tx switching time and the AGC and a reception UE receives a signal after the time Tg appears. A transmission UE may transmit a signal after the time Tg appears or may transmit all signals corresponding to a time period corresponding to the first symbol. The reception UE receives a signal after the Tg time appears. In this case, the first symbol is used in a manner that partial time of the last symbol is attached to the first symbol. In FIG. 17, time as much as one S3 and two S2 is detached from the last symbol and a symbol length of the last symbol is reduced as much as the detached time. The time detached from the last symbol may correspond to time as much as a part of signals repeated M−1 times among signals repeated M times when signals of a form of M combs are used.

Meanwhile, if the reception UE does not perform Tx in a previous subframe, Rx/Tx switching time is not necessary. Hence, time shorter than the Tg can be separately defined and managed as Tk in consideration of UEs not performing Tx in a previous subframe. In this case, the transmission UE transmits data after the Tk elapses (or, the transmission UE may transmit all signals corresponding to a time period corresponding to the first symbol) and a UE, which used to perform Rx in the previous subframe, receives data after the Tk elapses. (If it is determined that the transmission UE transmits data as much as time for which the Tg ends after the Tk time elapses, the reception UE can receive the data.) Since the reception UE, which used to perform Tx in a previous subframe, needs both the Rx/Tx switching time and the AGC time, the reception UE receives data after the Tg elapses.

Since the reception UE fails to receive signals during the time Tg or Tk in the first symbol and fails to receive signals as much as time detached for the first symbol in the last symbol, a part corresponding to not received signals among received signals can be attached. By doing so, it may be able to decode the entire signals and apply FFT identical to FFT of a different symbol.

Since it is difficult for the reception UE to determine information on whether or not the transmission UE transmits signals as much as the time for which the Tg ends after the Tk elapses, a control channel may inform the reception UE of the information on whether or not the transmission UE transmits signals via signaling. Or, similar to the case of 4), in the case of 5), it may not transmit a signal during the time Tk and the reception UE can be configured not to receive a signal during the Tk. If the reception UE does not need the Rx/Tx switching time, it may configure the reception UE to receive data after the Tk. If the reception UE needs the Rx/Tx switching time, it may configure the reception UE to receive data after the Tg.

Since it is difficult for the reception UE to determine information on whether or not the transmission UE transmits signals as much as time of the Tg section, a control channel may inform the reception UE of the information on whether or not the transmission UE transmits signals via signaling. Or, similar to the case of 4), in the case of 5), it may not transmit a signal during the Tg section and the reception UE can be configured not to receive a signal during the Tg section.

In case of the 4) and the 5), values for the Tg and the Tk can be fixed to a Tx/Rx value in advance. Or, the transmission UE may inform the reception UE of the values via a control channel. i) If the reception UE performs Tx in a previous subframe, a subframe except the Tg section is defined as on-off masking in a time axis. ii) If the reception UE performs Rx in a previous subframe, a subframe except the Tk section is defined as on-off masking in a time axis. Then, time domain to be received by the reception UE can be defined.

Moreover, in case of the 4) and the 5), a CP can be attached to the back of a symbol. In this case, it is necessary to have at least one repeated signal in a time period for which transmission or reception is to be performed except the T. And, it is necessary to additionally have a signal of a length longer than a length of a CP in the time period.

Figure 18:
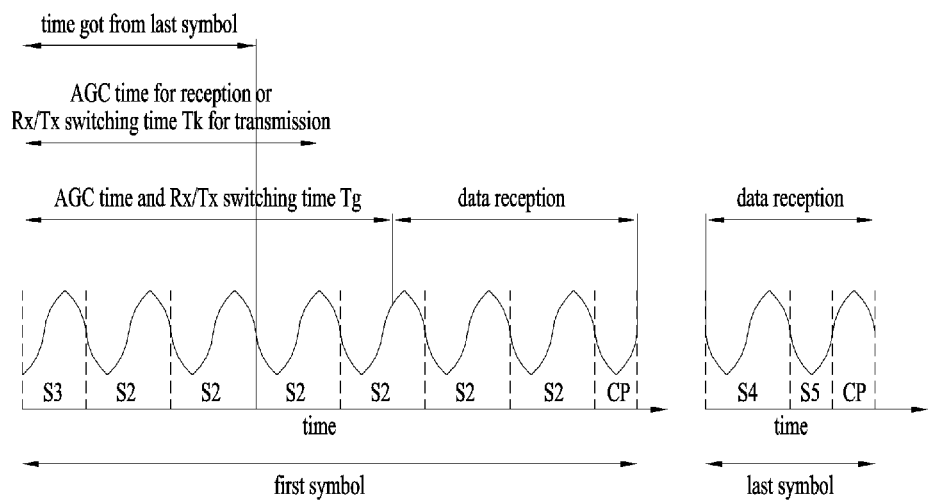

Referring to FIG. 18, it is able to see that one S2 signal repeated in a time section except the time Tg appears in a first symbol and a signal of a length longer than a CP length additionally exists in the time section for Tx or Rx. It is able to see that one repeated S4 signal appears in the last symbol and a signal of a length longer than a CP length additionally exists in the last symbol for Tx or Rx.

Moreover, in case of the 4) and the 5), it may be able to additionally secure Rx/Tx switching time or AGC time by adjusting a length of a slot. For example, in relation to an uplink resource in LTE system, a first symbol of two slots in a subframe has a CP length longer than a CP length of other symbols. In this case, a CP length of a first symbol of a second slot among two slots is reduced to match the CP length with CP lengths of other symbols and the remaining length is attached to the first symbol of the subframe to make a length of the first symbol to be longer. By doing so, it may be able to more secure Rx/Tx switching time or the AGC time.

Although the cases of the 1) to 5) are focusing on the design of the first or the last OFDM symbol, the cases can also be applied to a different symbol as well.

According to the aforementioned techniques, partial time is used for AGC time or switching time while signals/data of a comb form are transmitted in the first symbol or the last symbol. Yet, if a system applies a specific form to a partial symbol only, it is highly probable that implementation complexity increases. And, since the AGC time is configured by 70 us in current D2D and the AGC time is close to a length of an OFDM symbol, it may be necessary to have a different approach.

If AGC time for V2X is close to a symbol, for example, if time of 70 us is considered as AGC time, it is highly probable that a part corresponding to a symbol is to be used as AGC. Since current switching time corresponds to 5~10 us, it may be necessary to have AGC time+switching time as much as maximum 80 us in total. In this case, since a length of one OFDM symbol corresponds to 70 us, it is necessary to use up to 10 us of a second symbol. Currently, since a CP length corresponds to about 4 us, although it is assumed that the first symbol is not used for transmitting data, a significant error may occur at data of the second symbol.

If it is determined that a current CP (4 us) is longer than delay spread, it may reduce CPs of other symbols. And, it may consider a method of utilizing a length corresponding to the sum of the reduced CPs of other symbols as a CP. For example, if it is able to bring a CP as much as 1 us from 12 symbols except the first symbol and the second symbol and increase a CP length of the second symbol to 16 us by adding the 12 us, a length of the first symbol and 10 us of the second symbol are used as the AGC and the switching time and 6 us corresponding to the remaining CP length of the second symbol can be used as a CP of the second symbol.

Or, as a similar format for V2X, it may consider a method of reducing CPs of other symbols and utilizing a length corresponding to the sum of the reduced CPs of other symbols for a CP of the first symbol. Similarly, it may be able to configure all symbols except the first symbol to have the same CP (a CP shorter than LTE system), configure the first symbol to have the longest CP, and use the longest CP as the AGC and the switching time. Or, it may be able to configure all symbols to have the same CP (a CP shorter than LTE system) and puts a gap prior to the first symbol to have the AGC and the switching time.

Figure 19:
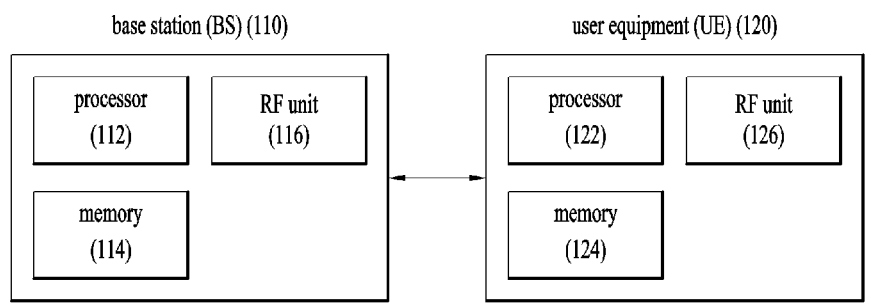
FIG. 19 is a diagram for examples of a base station and a user equipment capable of being applied to an embodiment of the present invention.

FIG. 19 is a diagram for a base station and a user equipment applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 19, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of transmitting a signal for V2X communication in a wireless communication system and an apparatus therefor can be applied to various wireless communication systems.

What is claimed is:

1. A method of receiving a signal, which is received by a user equipment for V2X (vehicle to everything) communication in a wireless communication system, comprising the steps of:
receiving a V2X signal in a time domain; and
acquiring, from the V2X signal, V2X data in resource elements, which correspond to a plurality of subcarriers determined according to a specific pattern among subcarriers configured for the user equipment and have a specific symbol index,
wherein the V2X data is allocated in a manner of being separated on a plurality of the subcarriers as much as an interval determined according to the specific pattern in a frequency domain and wherein the V2X signal is characterized in that a V2X data signal is repeated as many as a count corresponding to the specific pattern at a time interval corresponding to one symbol in the time domain.

2. The method of claim 1, wherein the V2X signal is configured in a manner that a cyclic prefix precedes at the time interval and the V2X data signal appears after the cyclic prefix.

3. The method of claim 2, wherein the V2X data is obtained from a first V2X data signal appearing after the cyclic prefix.

4. The method of claim 3, wherein the V2X data is obtained by performing FFT (Fast Fourier Transform) on a V2X data signal which is restored by repeating the first V2X data signal appearing after the cyclic prefix.

5. The method of claim 3, wherein a time interval between the first V2X data signal and the last of the time interval is configured to be used as a Tx/Rx switching section.

6. The method of claim 5, wherein a value corresponding to the Tx/Rx switching section is received via a control channel.

7. The method of claim 2, wherein the V2X signal comprises a first section for performing AGC (automatic gain control) and a second section for receiving data and wherein the V2X data is obtained from a V2X data signal corresponding to the second section.

8. The method of claim 2, wherein the time interval corresponds to a subframe, wherein the V2X signal comprises a first section for performing AGC (automatic gain control) and Tx/Rx switching and a second section for receiving data in the subframe, and wherein the V2X data is obtained from a V2X data signal corresponding to the second section.

9. The method of claim 1, wherein the time interval is indicated via on-off masking.

10. A method of transmitting a signal, which is transmitted by a user equipment for V2X (vehicle to everything) communication in a wireless communication system, comprising the steps of:
allocating V2X data to resource elements, which correspond to a plurality of subcarriers determined according to a specific pattern among subcarriers configured for the user equipment and have a specific symbol index; and
transmitting a V2X signal in a time domain based on the resource elements to which the V2X data is allocated, wherein the V2X data is allocated in a manner of being separated on a plurality of the subcarriers as much as an interval determined according to the specific pattern in a frequency domain and wherein the V2X signal is characterized in that a V2X data signal is repeated as many as a count corresponding to the specific pattern at a time interval corresponding to one symbol in the time domain.

11. A user equipment receiving a signal for V2X (vehicle to everything) communication in a wireless communication system, comprising:
a radio frequency unit; and
a processor, the processor configured to receive a V2X signal in a time domain, the processor configured to acquire, from the V2X signal, V2X data in resource elements, which correspond to a plurality of subcarriers determined according to a specific pattern among subcarriers configured for the user equipment and have a specific symbol index,
wherein the V2X data is allocated in a manner of being separated on a plurality of the subcarriers as much as an interval determined according to the specific pattern in a frequency domain and wherein the V2X signal is characterized in that a V2X data signal is repeated as many as a count corresponding to the specific pattern at a time interval corresponding to one symbol in the time domain.

* * * * *